United States Patent

Rowland-Hill

[15] 3,669,122
[45] June 13, 1972

[54] AXIAL FLOW COMBINE WITH A ROTARY DISCHARGE

[72] Inventor: Edward William Rowland-Hill, Lancaster, Pa.

[73] Assignee: Sperry Rand Corporation, New Holland, Pa.

[22] Filed: June 10, 1971

[21] Appl. No.: 151,682

Related U.S. Application Data

[63] Continuation-in-part of Ser. No. 51,082, June 30, 1971.

[52] U.S. Cl. ..........................................130/27 T
[51] Int. Cl. ..........................................A01f 12/44
[58] Field of Search..............130/27 R, 27 F, 27 T, 27 P, 130/27 Z, 6

[56] References Cited

UNITED STATES PATENTS

| 2,318,661 | 5/1943 | Beckmann | 130/27 Z |
| 3,373,871 | 3/1968 | Huether | 130/27 T |
| 3,602,230 | 8/1971 | Knapp | 130/27 T |
| 3,616,800 | 11/1971 | Rowland-Hill et al | 130/27 T |

*Primary Examiner*—Antonio F. Guida
*Attorney*—John C. Thompson et al.

[57] ABSTRACT

The axial flow combine has two threshing and separating units in side-by-side relation that receive cut crops in the front and discharge threshed material in the rear through downwardly facing openings to a rotary discharge assembly. A grain pan and a grain cleaning mechanism are positioned underneath the axial flow unit to receive and clean separated grain. The grain cleaning mechanism extends rearwardly substantially further than the axial flow units. The rotary discharge assembly comprises a deflector shield pivotally mounted to the discharge of the axial units, a curved transverse grate and a four-bladed beater. The beater is rotatably mounted above the grate to sweep the discharged crop material across the grate and impel it rearwardly in an upwardly curved arc over and rearwardly of the rear end of the grain cleaning mechanism.

16 Claims, 9 Drawing Figures

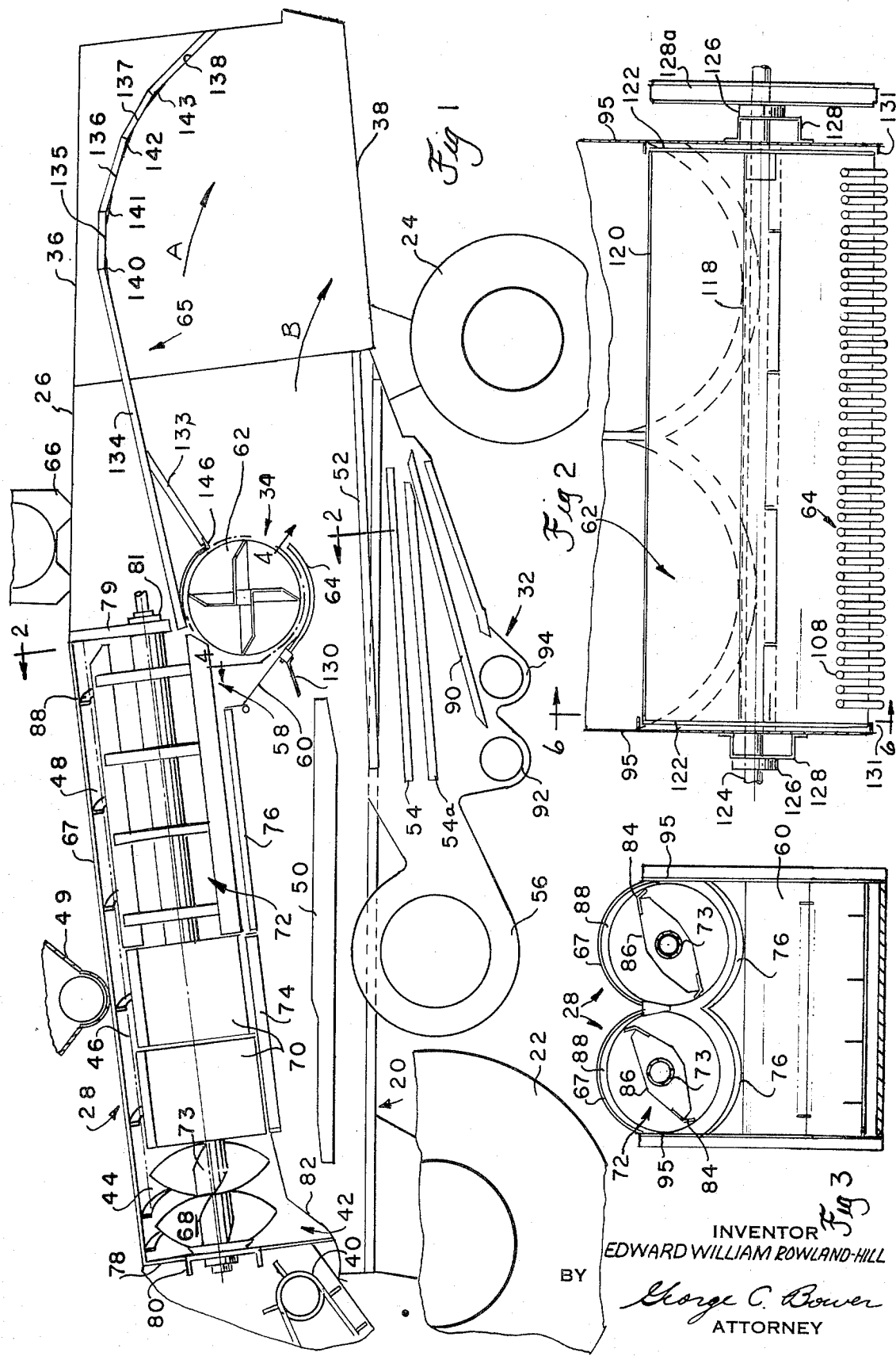

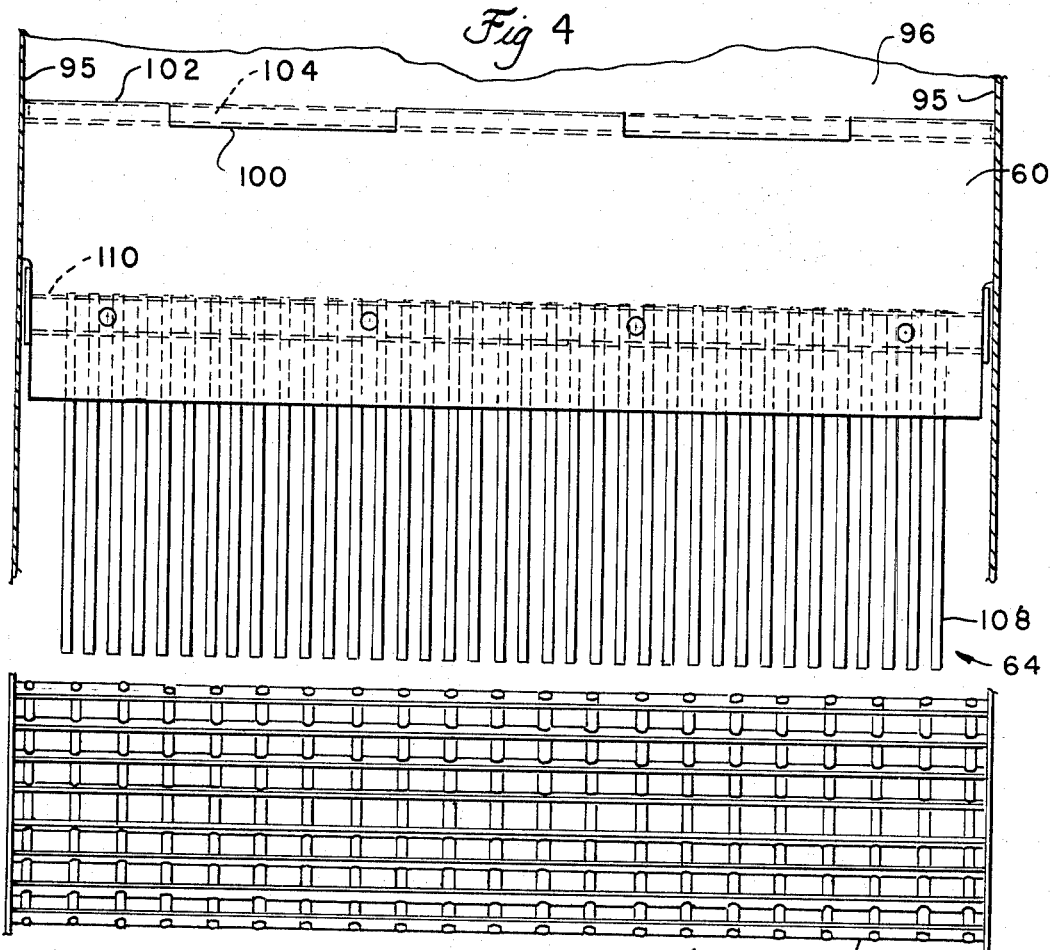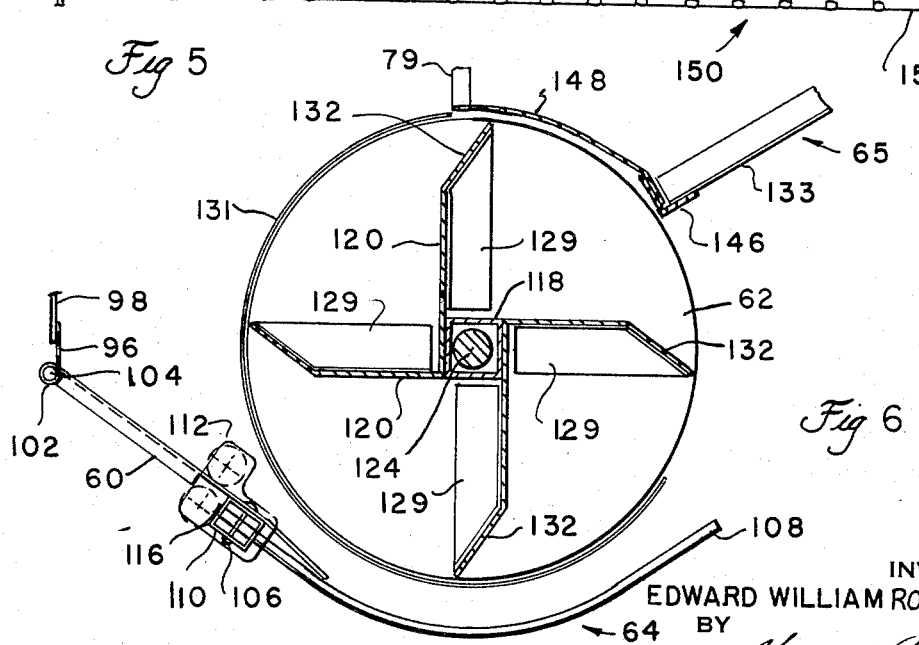

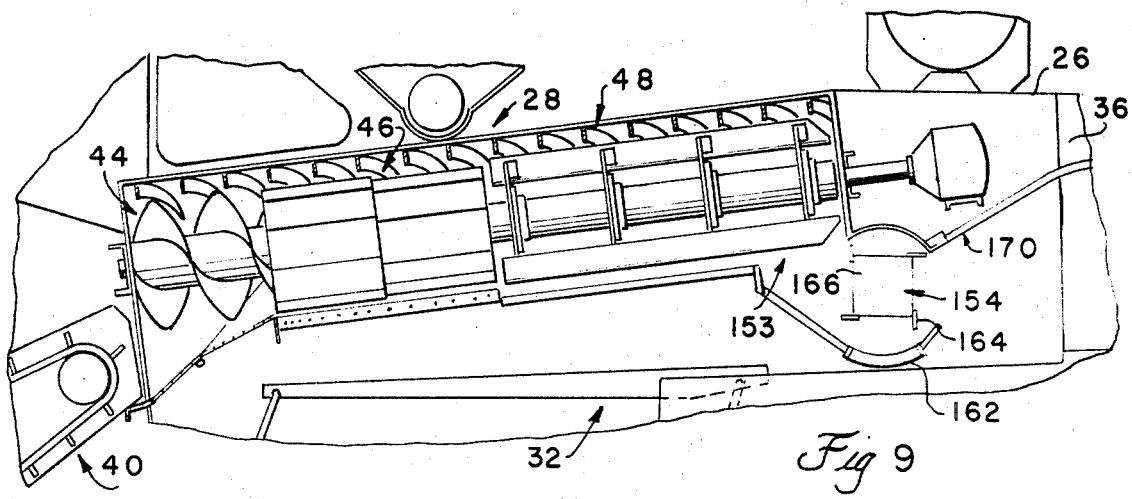
Fig 9
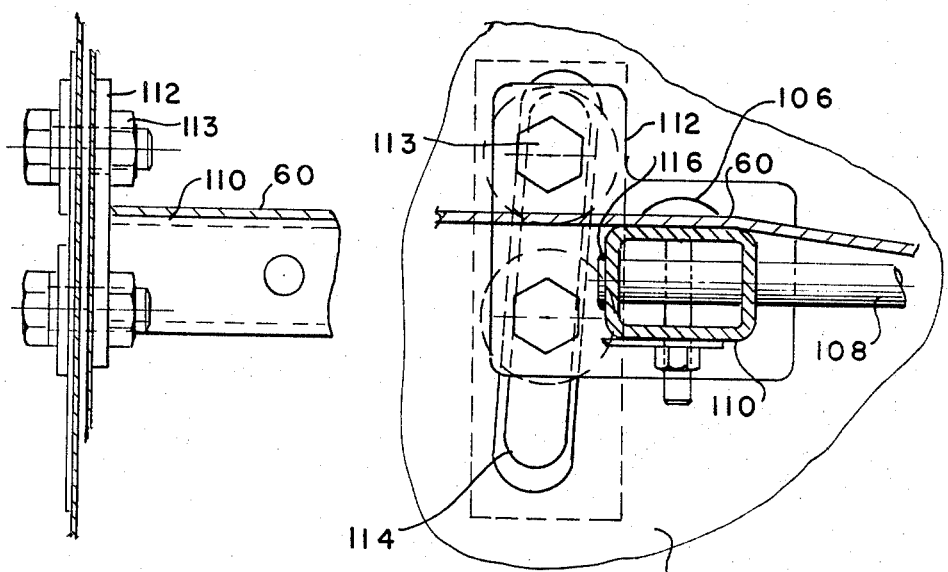
Fig 7
Fig 8
INVENTOR
EDWARD WILLIAM ROWLAND-HILL
BY George C. Bower
ATTORNEY

AXIAL FLOW COMBINE WITH A ROTARY DISCHARGE

RELATED APPLICATION

This is a continuation-in-part of my co-pending application Ser. No. 51,082 filed on June 30, 1971, and entitled, "An Axial Flow Threshing and Separating Means with a Load Distributing Threshing Rotor."

BACKGROUND OF THE INVENTION

This invention relates to axial flow type combines and is directed particularly to the discharge of threshold material from the combine.

The type of axial flow mobile combine having side-by-side axial flow units, in connection with which the present invention is described, is fully shown and described in the German Offenlegangsschrift No. 2000533 published on Aug. 27, 1970, and entitled, "Axial Flow Type Combine." As with conventional combines these combines have on front large wheels to drive the combine and a large header and crop elevator to harvest and deliver cut grain bearing crops to the axial flow units. Feed means at the front of these units draw the crop in from the elevator and feed it to threshing and separating sections. These sections remove and separate the grain from the crop and then pass it to separating sections for removing threshed grain carried in the threshed material.

The axial threshing and separating action has such a high efficiency. Therefore, the total length of the axial threshing and separating means is substantially shorter than the conventional threshing cylinder and straw walkers. This difference is in the order of one half the length of the conventional threshing and separating means. However, the chaff and debris passing through with the separated grains is generally similar so that the grain cleaning mechanism is in the order of the length of the conventional grain cleaning mechanism. In present axial flow combines the grain cleaning mechanisms may be of a type similar to conventional mechanisms. Therefore, the threshed material is being discharged from the rear end of the axial threshing and separating means which is near the middle of the grain handling and cleaning mechanism.

This forward termination of the separating means places the discharge of the threshed material over the grain cleaning mechanism rather than over the hood opening at the rear. Discharge means are then necessary to discharge the threshed material through the rear hood opening.

The threshed material could be discharged out through the sides of the combine. This has the disadvantage, in the twin axial flow units, of forming two windrows instead of one large windrow and would require two sets of choppers or scatterers or the like if further processing of the straw is desired.

In the combine described in the aforementioned Offenlegungsschrift No. 2000553 and my co-pending U.S. Pat. application, Ser. No. 879,215 filed on Nov. 24, 1969, now Pat. No. 3,616,800 and entitled,, "An Axial Flow Type Combine with a Discharge Conveyor" which was published on Aug. 27, 1970 as Offenlegungsschrift No. 2000554, endless chain conveyors carry the straw from the axial units discharge to the rear opening. These conveyors have many parts including two sets of sprockets and chains, four bearings and cross pieces. This construction is expensive to manufacture and has several working parts which require maintenance and repair.

OBJECTS AND SUMMARY OF THE INVENTION

An object of this invention is to provide, in a combine having axial flow separating means terminating well forward of the rear end of the grain cleaning means, a discharge means that keeps the threshed material clear of the chaff and debris discharged by the grain cleaning means and is simple, of generally low cost, and reliable in operation.

Another object of this invention is to provide a discharge means of the aforesaid type that removes entrained grain in the threshed material as well as discharges the material.

Another object of this invention is to provide a straw discharge means of the aforesaid type that is free of wrapping and fouling by crop material.

In summary, this invention comprises axial flow separating and threshing means and a rotary discharge assembly at the discharge end of the axial flow threshing and separating means with the assembly including a rotary beater and curved grate means positioned underneath the rotary beater which sweeps the discharge material across the grate means and upwardly and rearwardly over the grain cleaning means and out of the combine.

These and other objects and advantages of this invention will be apparent from the following drawings which illustrate the various features of this invention.

BRIEF DESCRIPTION OF THE DRAWINGS

FIG. 1 is a side view of the threshing and separating section, separating section and the grain cleaning means of the combine.

FIG. 2 is a rear view of the rotary discharge assembly taken along line 2—2 of FIG. 1 without the grain handling and cleaning means and separating rotors.

FIG. 3 is a fragmentary rear view of the threshing and separating means and the rotary discharge assembly without the beater, beater supports and drive taken along line 2—2 of FIG. 1.

FIG. 4 is a fragmentary plane view of the grill type grate means taken along line 3—3 of FIG. 1.

FIG. 5 is a plane view of the cross type grate means.

FIG. 6 is an enlarged sectional view of the left end of the beater taken along line 6—6 of FIG. 2.

FIG. 7 is a side view of the bracket position the grates means and deflector shield.

FIG. 8 is an inside plane view of the brackets positioning the grate means and deflector shield.

FIG. 9 is a left side view of the threshing and separating section and a fragment of the grain cleaning means.

DETAILED DESCRIPTION OF PREFERRED EMBODIMENT

As previously mentioned, these mobile axial flow type of combines, in which this invention is embodied for the purposes of this description, is disclosed in the aforementioned Offenlegungsschrift No. 2000553. These combines, as the conventional combines, harvest the crop by a header or row crop attachment mounted on a crop elevator attached to the combine. The combine described herein generally has a supporting frame 20 (FIG. 1) mounted on large front drive wheels 22 and small rear steering wheels 24. A housing 26 on the frame encloses and supports two axial flow threshing and separating units 28, grain handling and cleaning mechanism 32 and the rotary discharge assembly 34. The housing extends rearwardly and has a hood 36 mounted on the rear for enclosing the back of the housing and providing a large fore- and-aft space with a downwardly facing opening 38 for discharge of chaff and straw on to the ground.

The motor 66 on the rear portion of the housing 26 provides power to drive the combine and operate the header, crop elevator, axial units, rotary discharge, grain handling and cleaning mechanism and other power operated parts by suitable drive means, not shown.

The fragmentarily shown crop elevator 40 delivers the harvested crop to crop feeding means 42 which guides the crop into the axial threshing and separating units. The axial threshing and separating units have feed sections 44, threshing and separating sections 46 and separating sections 48. The feed sections 44 receive the harvested crop from the crop feeding means and deliver it to the threshing and separating sections 46 which threshes the harvested crop and passes grain and chaff onto the grain pan 50 of the grain handling and cleaning mechanism 32. The straw is delivered to the separating sections 48 for further removing the separated grain and depositing it on the grain handling and cleaning mechanism. The clean grain is deposited in a conventional grain tank 49 by crop elevator, not shown. The grain handling and cleaning mechanism primarily comprises the grain pan 50, chaffer and grain sieves 52,54 and blower 56. Sieve 54a may be provided when harvesting small grain or seeds. The blower provides a stream of air for cleaning chaff from the grain and discharging out the rear opening. The chaffer sieve 52 discharges chaff and debris over the edge of the sieve on to the ground.

At the end of the separating sections 48 are downwardly facing openings 58 which lead to a rotary discharge assembly 34. As best shown in FIGS. 1 and 6, the assembly includes deflector shield 60, a rotary beater 62, grate 64 and guide wall 65. The beater 62 sweeps the threshed straw across the grate and expels it in an upwardly curved arc out through the rear part of the hood opening.

In this preferred embodiment the axial threshing and separating means is described as two axial units in side-by-side relation. However, the invention described and shown in this embodiment is adaptable to a single axial threshing unit.

CROP FEEDING MEANS AND THRESHING AND SEPARATING MEANS

The two axial flow threshing and separating units 28 comprise two generally cylindrical casings 67, feed augers 68 in section 44, threshing rotors 70 in sections 46 and separating rotors 72 in sections 48. The threshing rotors 70 and separating rotors 72 are mounted on shafts 73 (FIGS. 1 and 3) and cooperate with concaves 74 and grates 76, respectively, of the casings 67 to thresh and separate crops and to separate the threshed grain from the straw. The threshed and separated grain collects on the grain pan 50 and is moved rearwardly under the action of the downward incline and fore- and-aft reciprocating movement of the grain pan onto the chaffer sieve 52.

The separating grates 76 extend rearwardly from the concaves and terminate short of the separating rotors 72 to provide openings 58 below the rear end of the rotors for the discharge of the straw which has completed the separating action.

The casings 67 have front and rear end walls 78 and 79 and transverse beams 80 and 81 rotatably supporting the shafts 73.

The crop feeding means 42 at the front of the combine comprises feed augers 68 and guide plate 82. The augers are mounted on the shafts 73 along with the threshing and separating rotors 70,72. The guide plate 82 extends across the front of the combine and from the end of the crop elevator 40 upwardly to underneath intermediate portions of the feed augers 68 for delivery of the crops to the feed sections. Thus, the harvested crops are fed to threshing and separating units, and subject to the threshing and separating actions for the removal and separation of the grain from the crop material and the discharge of the threshed material to the ground.

The rotors of the threshing and separating sections are of the type described in the United States patent application of which this is a continuation-in-part. The rotors 70 have an oval shape configuration that form spaces along the side of the rotors. The rotors have longitudinally extending rasp bars 83 to cooperate with the concaves in threshing the harvested crop. As in the original case, the rotors of each unit are in two parts. The two parts are circumferentially offset so that the rotor parts commence and complete the threshing actions at different times to distribute the threshing load. The threshing times of the rotors of the two units may be related so that the threshing actions commence and end at different times. This feature is fully explained in the aforementioned original application.

The separating sections have longitudinally extending diametrically positioned blades 84 (FIG. 3) mounted on spaced spiders 86 extending radially from the shafts 73 and from the separating rotors into diametrical elongated shapes. This shape provides space along the sides of the rotors.

The crops are carried around in the casings with the rotors to repeatedly sweep the crops across the concaves and grates. On the inside of the top of the casings are transport fins 88 to spirally move the crop axially as it is carried around by the rotors. The rotors are turned at several hundred revolutions per minute and pass the crop material through the axial units as rapidly as it is fed. There is no accumulation and delayed transport as with the straw walkers of the conventional combine. Also the harvested crop is formed into a thin mat which aids in a thorough threshing and separation of the grain.

A feature of the spaces along the side of the rotors is to pass rocks or other debris that is picked up by the header and passed through the crop elevator with a minimal possibility of causing damage.

In the previous description of the feed, threshing and separating sections of the axial flow units specific forms of these sections have been set forth, as illustrative of one of the many forms of the axial flow threshing and separating means with which the invention may be used.

GRAIN HANDLING AND CLEANING MECHANISM

As previously covered the grain handling and cleaning mechanism is similar to conventional combines. The grain pan 50 extends across the combine underneath the axial units and from just forwardly of the threshing sections to the rear end of the separating section grates 76. Thus, the pan extends over the entire length and area of the concaves and grates to catch the separated grain. The chaffer and grain sieves 52 and 54 respectively are mounted to oscillate fore- and-aft to move the chaff and other debris to the rear of the chaffer sieve and the tailings to the rear of the grain sieve. The chaffer sieve extends rearwardly beyond the end of the housing 26 into the hood area. This end projects over the openings 38 for the discharge of the material on the chaffer sieve on the ground. The grain sieve also operates conventionally and passes clean grain onto the chute 90 for delivery to the grain auger 92. The tailings drop off the rear end of the grain sieve to slide down the casing to the tailings auger 94.

An important feature of the grain handling and cleaning mechanism is the relationship of the air stream from the blower 56 and the rotary discharge assembly 34. The air stream passes up through the grates to partially fluidize the chaff and debris on the sieves. Essentially the main function is to blow the airborne chaff from the grain as the chaff and grain drop off the rear of the grain pan. This forms a chaff bearing air stream flowing over the chaffer sieve and out through the forward portion of the opening 38 in the hood. In the discharge of the straw from the separating sections this air stream should not be materially distributed so that the light chaff is cleared from the combine and does not have to be handled by the chaffer sieve.

ROTARY DISCHARGE ASSEMBLY

The rotary discharge assembly 34 extends between the side walls 95 (FIGS. 1 and 3) of the housing at the discharge end of the separating sections and over the chaffer sieve. The assembly is downward and rearward of the separating sections and generally comprises a deflector shield 60, a grate 64, a rotary beater 62 and a rearwardly extending guide wall 65.

The deflector shield is a solid sheet metal piece extending across the housing to guide the discharge straw downwardly and rearwardly from the rear of the grates. A substantially vertical plate 96 is bolted to the end beam 98 of the grate and fastened to the side walls of the housing. The lower edge of the plate has a segmented circular bead 100. The deflector shield 60 has a corresponding segmented bead 102 interfitting with the bead 100 (FIG. 4). A straight cylindrical rod 104 extending through the segments to hingedly interlock the plate and shield so that the deflector shield may be pivoted downwardly. The grate is attached to the deflector shield along the lower transverse edge or portion by fastening means 106 so that the grate and shield may be pivoted together downwardly and forwardly from the beater.

The grate 64 may be in a cross member form or a parallel bar or grill form. The latter will be considered first and is shown in FIGS. 1, 2, 4 and 6. The grill form comprises a plurality of parallel curved rods 108 extending fore- and-aft and underneath the beater 62 and have spaces therebetween. The last percentages of the grain pass through these spaces. The rods are mounted at the forward ends in a square tubular member 110 extending between the walls of the housing. The member 110 has brackets 112 at each end for adjustably attaching the member to the walls by bolts and nuts 113 extending through slots 114 in the walls. The rods extend through holes in the tubular member and are welded at 116 to the member. The spacing between the rods and the beater is adjusted by means of the brackets and fastenings to the walls. Under certain crop conditions wads of green material may be formed in the axial units and are of sufficient size and consistency so as not to break up and pass through the discharge assembly. The deflection shield 60 and grate can then be detached from the walls and pivoted downwardly to remove the blocking wad.

The beater 62 comprises a square tubular center shaft 118 (FIG. 6) extending across the combine, two L-shaped metal members 120, forming the blades, and two circular discs 122, mounted on opposite ends of the shaft. The tubular shaft has a cylindrical shaft 124 extending therethrough and through the side walls 95 of the housing 26. The exterior ends are rotatably mounted in bearings 126 on the outside of the housing. The bearings are attached to U-shaped brackets 128 mounted on the side walls, respectively. The beater is driven by a belt and pulley drive means 128a connected to the motor 66. Also the blades may be replaced by spikes.

The threshed crop material or straw is continuously delivered in a mat downwardly through the opening onto the deflector shield. The straw is moving substantially vertical through the discharge openings and is deflected to the horizontal by the shield. The tips of the blades pass over the lower edge of the shield and carry the material along the grate and then discharge it through the space up along the guide wall in an upwardly curved path and then downwardly to discharge through the rear portion of the hood opening. The L-shaped members forming the blades are sheet metal pieces bent longitudinally and intermediately into two blades perpendicular to one another. The members are attached to opposite sides of the tubular shaft by welding or other suitable fastening means and attached to the discs by gussets 129.

A plate 130 extending across the combine is attached to the beam 110 and sloped rearwardly and downwardly to intercept air flow from the threshing and separating means that may interfere with the air stream from the cleaning blower 56.

The vexatious problem of wrapping is eliminated by locating the bearings on the opposite side of the housing walls from the beater and isolating the shaft 124 from the blades by the end discs. For further assistance circularly curved rims 131 may be mounted on the inside of the walls and overlap the peripheries of the discs to further isolate the shafts from the discharged crop material. The rims extend part way around the peripheries of the disc. In the direction of rotation the rims extend from about the wall 79 to the rear end of the grate. Wrapping around the beater is avoided by the length of the periphery of the beater being too long for the crop material. The ends or tips 132 of the blades are bent longitudinally to slope the blades opposite to the direction of rotation of the beater.

The guide wall 65 to the rear of the beater extends across the housing and hood and rearwardly at a slight upward angle and then curved downwardly in the hood to the end wall of the hood. The wall is formed from segments of flat sheet metal pieces 133-138 having end flanges attached to the walls and interconnected strips 140-143 extending across the hood and fastened to the plates to provide a more arcuate shape to the guidewall. The wall 65 may be successive pieces with bent overlapping angle portions. The pieces are fastened to angles mounted on the side walls of the hood.

The grate extends over an arc of approximately 100° along the bottom of the beater and the rear ends of the rods are at an upward angle to the horizontal. A transverse discharge space extends over an arc of approximately 80°, between the end of the grate 64 FIG. 6 and the angle beam 146 extending transversely across the housing and is positioned close to the periphery subscribed by the tips. A curved wall 148 above the beater covers the space between the angle beam and the rear end wall of the axial units. The wall piece 133 of the guide wall extends radially from the beater and upwardly to the wall piece 134 which is sloped somewhat more to the horizontal. The upward angles the grate and walls projects the material as it leaves the beater at an upward angle.

The flow of discharged straw should not materially interfere with the flow of the discharge of the chaff. The beater impels the straw through an upward and then downward path A and the chaff air stream flow is through a path B. The light chaff and heavy straw are thus removed from the combine without substantial interference.

In the foregoing description the rotary discharge assembly has been considered in connection with discharging the threshed crop material or straw from the rear of the axial units out of the rear of the combine. But as mentioned previously it is also desirable to utilize the discharging step to reduce the grain loss. This very desirable objective is attained in the handling of the material. In the axial threshing and separating units the crop material is formed in what is known as a straw mat. The mats circulate around the casing and move rearwardly through the threshing actions and separating actions. At the discharge openings the mat is thrown downwardly against the deflection shield and changed in direction of travel by about 90° and then passes between the beater and grate. The reorientation within the mat frees a great deal of the remaining entrained grain which falls through the grate on to the chaffer sieve. This reduces the grain loss. For example, if the grain loss in the material on discharge from the separating sections is 3 percent, this loss is reduced to about 1 percent. The loss has been reduced by two-thirds.

The embodiment shown in FIG. 1 has a grill type grate. This type of grate is used for wheat, oats, barley, seeds and etc. However, for corn, a grate 150 with cross members 152 is desirable. A plan view of the cross grate 150 similar to the plan view of the grill type grate of FIG. 2 is shown in FIG. 5. A side view of another embodiment of this discharge assembly is shown in FIG. 9.

In the embodiment of FIG. 5 the cross grate 150 is fastened to an angle member with brackets similar to tubular member 118 and the discharge is curved under the beater 62 and upwardly similar to the grill form. The grain that is still attached to pieces of the cob are removed from the pieces by the rubbing action and fall through the grate.

In FIG. 9 another embodiment is shown in connection with axial flow threshing and separating units similar to the units in the combine of FIG. 1. The feed sections 44 receive the crop from the elevator 40 and crop feeding means 42 and delivers it to the threshing and separating sections 46 for sweeping the crop across the concaves 74. The crop is then spirally and rearwardly fed to the separating sections 48 with grates 76. The crop is then discharged from the rear openings 153. The center rear discharge beater 154 extends across the width of the combine and the rear openings 153 of the axial units 158. The straw drops onto the feed plate or deflector shield 160 and is swept across the grate by the beater turning in the direction C. The beater then forcefully discharges the straw from the rear edge of the grate 162 and out of the combine. A straw deflector plate 160 extends downwardly and rearwardly from the upper edge of the discharge opening. The beater 154 has four blades 164 mounted on a rectangular frame 166 which is symmetrical about the axes of rotation. A final separating action is obtained in the reorientation of the straw as it falls on the feed plate or straw deflector plate and is swept across the grate 162. Separated grain drops through the grate onto the cleaning means 32. The chaff and the threshed material are separately discharged from the combine. The chaffer sieve, through the grate onto the cleaning means 32. The chaff and the threshed material are separately discharged from the combine. The chaffer sieve, not shown, of the grain handling and cleaning means extends to the rear of the housing 26 to drop the heavy chaff on the ground and the blower, not shown, provides an air stream that blows the light chaff out the rear. A guide wall 170 similar to the guide wall 65 extends rearwardly through the hood 36 to guide the threshed material rearwardly out of the combine.

SUMMARY OF FEATURES AND ADVANTAGES

The objective of a discharge of the threshed crops from intermediate the combine to the rear without interferring materially with the air stream bearing the chaff has been attained by a simple sturdy, inexpensive means. The rotary beater removes the threshed material as rapidly as it is discharged by the separating means and propels it in an upwardly curved arc to the rear of the downwardly facing opening in the hood. The arc of discharge is over and to the rear of the blower air stream. Thus avoiding deposit of the light airborne chaff on the chaffer sieve or deposit of the threshed material. The rotary beater is essentially made of six major parts fabricated from standard sheet metal pieces, tubular members and rods and easily assembled by standard manufacture methods. This availability and ready assemblage provides for an inexpensive construction. The beater is also relatively light in weight and sturdy. The securing the blades to the end discs as well as to the tubular shaft structurally reinforces the beater.

The discs, in addition, to strengthening the beater greatly reduce, if not eliminate, the possibility of wrapping on the shaft. This in cooperation with the peripheral length of the beater substantial prevents any wrap from occurring.

A particularly advantageous feature of the rotary discharge assembly is the reduction of the grain loss. There is constant striving to reduce this loss to a minimum. The assembly achieves this without the addition of any elements. The elements used in the discharging action are used in the separating action. The grain loss is materially reduced by the change in direction of the discharged mat and the sweeping of the straw across the grate.

Another advantageous feature is that the beater passes stones and other large foreign material along with the crop material and expels it out the rear. Such material that also passes through the threshing and separating means will also pass through the beater. Thus the beater does not detract from the stone handling capabilities of the axial flow threshing and separating means.

While the invention has been described, it will be understood that it is capable of further modifications and this application is intended to cover any variations, uses or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. An axial flow type combine comprising axial flow threshing and separating means for threshing crop material, separating means for separating grain from the remainder of the material, a grain pan underneath said means for collecting grain and moving the grain rearwardly, grain cleaning means underneath and extending rearwardly of said grain pan to clean the grain and discharge the chaff at the rear of the combine from said cleaning means and in an airborne stream, said separating means having opening means at the rear thereof for discharging the threshed crop material, a discharge assembly extending transversely to said separating means at the rear thereof for receiving material discharged from said opening means, said assembly having means at said opening means for receiving the discharged crop material, grate means extending substantially horizontal and rearwardly from said crop receiving means, a transverse beater rotatably mounted above said grate means to turn downwardly and rearwardly across said grate means to move the crop material across the grate means for removing entrained grain and propelling the material rearwardly out of the combine clear of the cleaning action of the grain cleaning means.

2. An axial flow type combine as set forth in claim 1 wherein said discharge assembly is downwardly and rearwardly of said threshing and separating means and said crop receiving means is a transverse deflector shield sloped downwardly and rearwardly from said threshing and separating means underneath said opening means, and said grate means is along the lower part of the shield.

3. An axial flow combine as set forth in claim 2 wherein said grate means is pivotally mounted for adjustment in relation to said beater.

4. An axial flow combine as set forth in claim 1 wherein there is an upper wall extending rearwardly from said beater to guide the propelled crops rearwardly of the discharge of the airborne stream of discharged chaff from the grain cleaning means.

5. An axial flow combine as set forth in claim 1 wherein said grate means are parallel bars extending rearwardly with parallel spaces between the bars.

6. An axial flow combine as set forth in claim 1 wherein said beater comprises a transverse rotatably mounted shaft having axially spaced circular discs at each end of said shaft and blades.

7. An axial flow type combine as set forth in claim 6 wherein said shaft is square shape and tubular and said blades are formed from two sheet metal pieces each bent into substantially similar parts and said pieces attached to opposite sides of said square tubular shaft with said parts extending outwardly to form said blades.

8. An axial flow combine as set forth in claim 7 wherein said blades have the free end portion bent opposite to the direction of rotation.

9. An axial flow combine as set forth in claim 1 wherein said transverse deflector shield is horizontally pivoted at the upper end adjacent said separator sections and said grate means is attached to said shield at the lower end and has brackets adjustably attaching said grate and shield to said combine.

10. An axial flow combine comprising
a supporting frame mounted on wheels;
a housing on said frame including a hood, said housing having a downwardly facing opening for passing chaff and threshed crop material to ground;
axial flow threshing and separating means extending for-and-aft in said housing;
means on the front of said frame for feeding harvested crops to said threshing and separating means;
said axial flow threshing and separating means having generally cylindrical casing means and rotor means in said cylindrical casing, said casing means having concave means and separator grate means along the bottom, means for spirally rotating the fed crop from the front of the axial flow threshing and separating mean through the casing in successive threshing actions and separating actions to separate the grain from the crop, and downwardly facing opening means at the rear for discharge of threshed material,
grain handling and cleaning mechanism underneath said axial flow threshing and separating means and extending rearwardly to said hood with the discharge end of said mechanism extending over said housing opening for discharge of chaff and debris, said grain handling and cleaning mechanism having a blower for creating an air stream to carry light chaff grain over the grain handling and cleaning mechanism out through the housing opening, and
a discharge assembly extending across said housing at the rear of said threshing and separating means and having a deflector shield downwardly and rearwardly sloped underneath said opening means for receiving the discharged threshed material, curved grate means extending substantially horizontal along the lower part of the shield, a transverse beater rotatably mounted above said grate means to move downwardly past the lower part of the shield and rearwardly across said grate means to sweep the threshed crop material across said grate means for removing entrained grain and propel the material upwardly and rearwardly, and a guide wall extended rearwardly from said beater at a gradual upward angle in said housing and in said hood downwardly curved to the rear of said housing opening for discharge of said threshed crop material over and beyond the chaff bearing air stream.

11. An axial flow combine as set forth in claim 10 wherein said beater has a shaft with opposite ends rotatably mounted in said housing blades extending from said shaft and discs at opposite ends of said shaft to prevent crop material from wraPping on said opposite ends of said shaft.

12. An axial flow combine as set forth in claim 10 wherein said beater has a square shaft and a single piece of sheet metal bent intermediately and longitudinally to form two blades and said piece attached to said shaft to extend said blades outwardly.

13. An axial flow combine as set forth in claim 10 wherein said deflector shield is pivotally mounted to move said shield and grate means away from said beater.

14. An axial flow combine as set forth in claim 13 wherein said deflector shield is pivotally attached to the end of the separator grate means.

15. An axial flow combine as set forth in claim 10 wherein said grate means extends upwardly along the rear and said guide wall extends from said beater above the horizontal level of the axis of rotation of said beater.

16. An axial combine comprising two axial flow threshing and separating units in parallel side-by-side relation and each having in axial alignment a feed section, a threshing and separating section and a separating section, said feed sections axially and circumferentially feeding harvested crop material to said respective threshing and separating sections for separation of the grain from the remainder of the crop material and passing the crop material to respective following separating sections for removal of separated grain, said sections having downwardly facing openings at the rear end thereof for discharging the crop material, a discharge beater assembly extending transversely to said units at the rear ends thereof, said assembly having a transverse downwardly and rearwardly sloped feed plate underneath said opening for receiving discharged crop material, a grate receiving the crop material from the plate and a transverse beater sweeping the crop material across the grate for removing any remaining entrained grain and discharging the crop material rearwardly from the combine.

* * * * *